(12) United States Patent
LeMense

(10) Patent No.: US 6,441,727 B1
(45) Date of Patent: Aug. 27, 2002

(54) ARRANGEMENT AND METHOD OF VEHICLE TIRE IDENTIFICATION

(75) Inventor: Thomas John LeMense, Farmington, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/789,790

(22) Filed: Feb. 20, 2001

(51) Int. Cl.[7] ............................................... B60C 23/00
(52) U.S. Cl. .................... 340/442; 340/10.42; 340/447; 73/146.5
(58) Field of Search ................................. 340/442, 444, 340/445, 447, 10.42; 73/146.5

(56) References Cited

U.S. PATENT DOCUMENTS

| 4,311,985 A | 1/1982 | Gee et al. |
| 5,285,189 A | 2/1994 | Nowicki et al. |
| 5,600,301 A | 2/1997 | Robinson, III |
| 5,612,671 A | 3/1997 | Mendez et al. |
| 5,771,480 A | 6/1998 | Yanase |
| 5,783,991 A | * 7/1998 | Jones .......................... 340/444 |
| 5,801,306 A | 9/1998 | Chamussy et al. |
| 5,838,229 A | 11/1998 | Robinson, III |
| 5,847,645 A | 12/1998 | Boesch |
| 5,923,244 A | * 7/1999 | Jones .......................... 340/442 |
| 5,939,977 A | 8/1999 | Monson |

* cited by examiner

Primary Examiner—Daniel J. Wu
(74) Attorney, Agent, or Firm—Tarolli, Sundheim, Covell, Tummino & Szabo L.L.P.

(57) ABSTRACT

An arrangement (10) and method for identifying a vehicle tire (20) to a vehicle-based tire condition unit (38) that utilizes the tire identification. An ECU (40) and an indication and control panel (42) of the vehicle-based tire condition unit (38) cooperate to prompt a person to spin the tire (20). A signal that is indicative of the tire being spun is provided to the vehicle-based tire condition unit (38). In one embodiment, the signal is provided by a wheel speed sensor (36). In another embodiment, the signal is provided by a sensor transponder (22) at the tire (20).

20 Claims, 4 Drawing Sheets

ARRANGEMENT AND METHOD OF VEHICLE TIRE IDENTIFICATION

TECHNICAL FIELD

The present invention relates to vehicle tire identification for systems that provide tire information. More particularly, the present invention relates to an arrangement that associates a tire identification with a tire location.

BACKGROUND OF THE INVENTION

A typical remote automotive tire condition monitoring system includes a plurality of tire-based sensory transponders and a central, vehicle-based arrangement. The sensory transponders include a component that senses a tire condition, such as tire inflation pressure or tire temperature. Each transponder is capable of outputting a coded transmission that conveys sensed tire condition information and an identification for reception by the vehicle-based arrangement. Within the vehicle-based arrangement, an electronic control unit ("ECU") processes the conveyed information and controls provision of information regarding the sensed tire conditions to a vehicle operator. During operation of such a system, the vehicle operator is readily notified of a current tire condition, such as a low inflation pressure in a tire.

In order for the vehicle operator to comprehend which tire currently has a condition of interest (e.g., a low inflation pressure), the information provided to the vehicle operator must unambiguously identify the location (e.g., right front) of the tire that has the condition of interest. In order for the ECU to provide such tire location information, the ECU has a memory that stores tire identification information for comparison with the identification conveyed from the transponder. Also, within the memory, a certain tire location is associated with each stored tire identification. Thus, once a provided identification is matched to a stored identification, a location on the vehicle is associated with the provided tire condition information. Accordingly, the operator is made aware that the tire at a certain location (e.g., right front) has the certain condition (e.g., low inflation pressure).

Changes routinely occur regarding the tires and/or transponders that are associated with a vehicle. The changes can result in new, different transponders being associated with the vehicle, or a rearrangement of the locations of the transponders, via rearrangement of the tires. Some examples of such changes occur when one or more new tires with new transponders are mounted on a vehicle (e.g., the placement of the initial set of tires during vehicle manufacture or replacement of one or more tires), when the tires are rotated during routine maintenance, or when a transponder is replaced on an existing tire. It should be readily apparent that new/modified identification and location information regarding the tire must be provided or "taught" to the ECU.

In order to accomplish the "teaching" of the tire identification information to a vehicle-based portion, one known tire identification system is placed in a "learn" mode via actuation of pushbutton(s) on an operator-accessible information panel of the vehicle-based portion. During the learn mode, the vehicle-based portion is in a ready state to receive a distinctive "learn" mode signal transmitted from each of tire-based transmitter of the system. In order to cause each tire-based transmitter to send the "learn" mode signal, a strong magnet is swept over the outside of the associated vehicle tire.

SUMMARY OF THE INVENTION

In accordance with one aspect, the present invention provides an arrangement for identifying a vehicle tire to a vehicle-based tire condition unit that utilizes the tire identification. The arrangement comprises means for prompting a person to spin the tire. Means provides a signal to the vehicle-based tire condition unit, the signal is indicative of the tire being spun.

In accordance with another aspect, the present invention provides an arrangement for identifying a location of one of a plurality of vehicle tires during a programming sequence of a tire condition monitoring system. The arrangement comprises means for providing a signal that is indicative of the one tire being spun. Means receives the signal at a vehicle-based unit of the tire condition monitor system.

In accordance with another aspect, the present invention provides an arrangement for identifying a vehicle tire. The arrangement comprises a component for prompting a person to spin the tire. A tire identification sensor sends a tire identification signal when the tire is spun. A condition sensor monitors a condition of the tire and sends a condition signal. A processing unit receives and processes the tire identification signal and the condition signal.

In accordance with yet another aspect, the present invention provides a method for identifying a vehicle tire to a vehicle-based tire condition unit that utilizes the tire identification. A person is prompted to spin the tire. A signal is provided to the vehicle-based tire condition unit, wherein the signal is indicative of the tire being spun.

In accordance with still another aspect, the present invention provides a method for identifying a location of one of a plurality of vehicle tires during a programming sequence of a tire condition monitoring system. A signal that is indicative of the one tire being spun is provided. The signal is received at a vehicle-based unit of the tire condition monitor system.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DESCRIPTION OF EXAMPLE EMBODIMENTS

Figure 1:
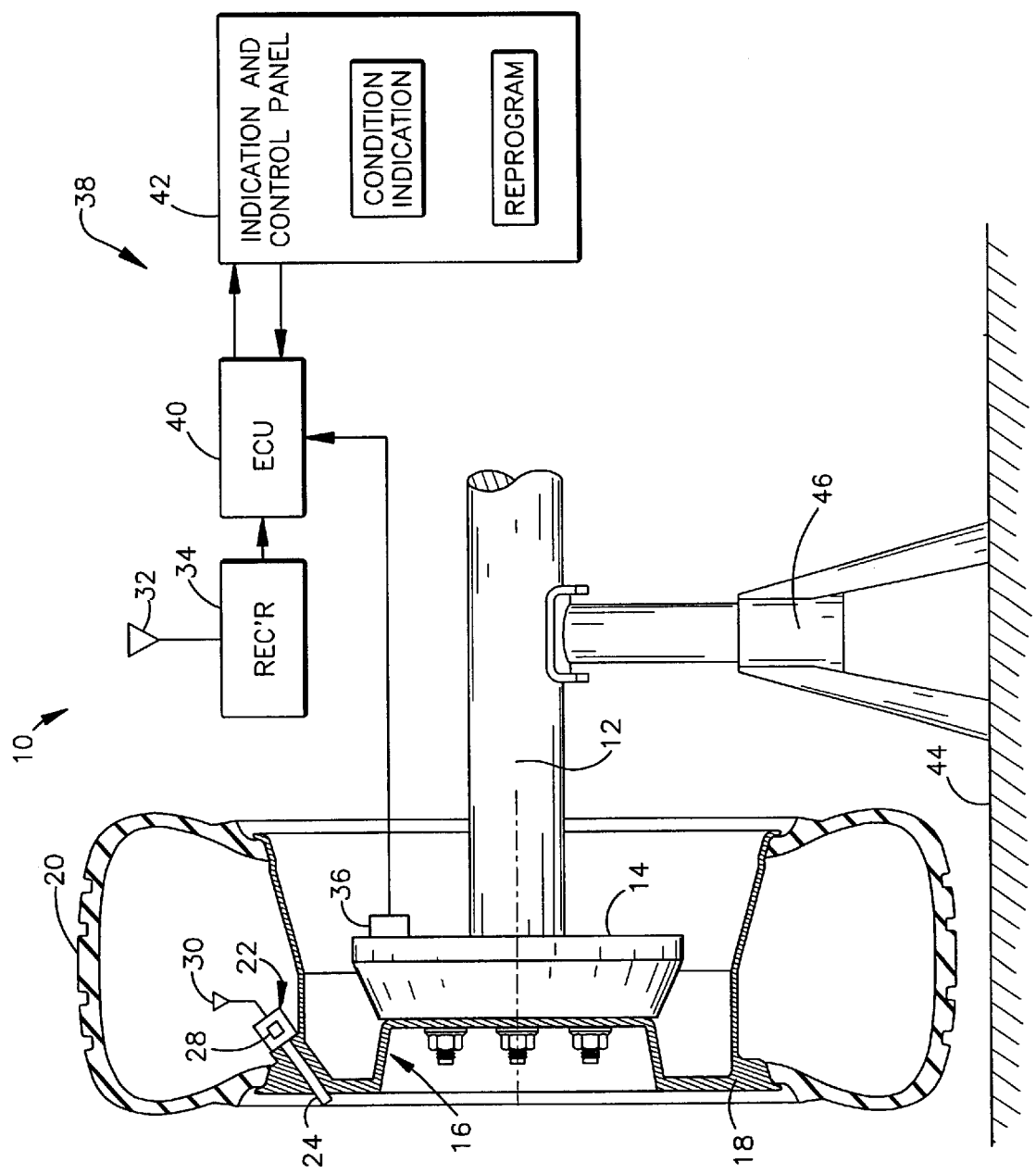
FIG. 1 is a schematic illustration of a first embodiment of a vehicle tire identification arrangement, in accordance with the present invention, along with related vehicle structure and vehicle servicing components.

An example embodiment of a vehicle tire identification arrangement 10, in accordance with the present invention, and certain portions (e.g., 12) of an associated vehicle are shown in FIG. 1. A shaft 12 of the vehicle includes a wheel end housing 14 that supports a wheel 16. The wheel 16 includes a rim 18 that supports a pneumatic tire 20. The rim 18 and the tire 20 bound a tire cavity that is inflated, e.g., with air, to have a pressure (i.e., the tire pressure).

The wheel 16/tire 20 carries a transponder 22 that is part of a tire condition monitoring system. In the illustrated example, the transponder 22 is located within the tire cavity and is mounted to an inner portion of a conventional tire inflation valve 24. It is to be appreciated that the transponder 22 may be mounted at some other location within the tire cavity.

The transponder 22 has various structures and features that are not to taken as a limitation on the present invention. In one example, the transponder 22 includes a pressure sensor that measures the pressure within the tire cavity. Thus, the transponder 22 is subject to the tire pressure. In addition or as an alternative to the pressure sensor, the transponder 22 includes a temperature sensor that measures the temperature within the tire cavity. Also, dependent upon the embodiment of the arrangement 10, the transponder 22 may include a centrifugal switch 28. The switch 28 is connected to control operation of the transponder 22 to occur during spinning rotation of the tire 20.

The transponder 22 includes an antenna 30 to transmit radio signals that convey tire condition information (e.g., pressure and/or temperature information). The transponder 22 has a unique identification code that is included in every signal transmission.

Even though only one tire 20 and associated transponder 22 are shown, the vehicle can have any number of tires and associated transponders. For brevity only the single tire and associated transponder are discussed in detail. It is to be appreciated that the discussions provided herein for the single tire and transponder are applicable to the other tires and transponders, respectively.

The transmitted signal from the transponder 22 is provided to a vehicle-based tire condition unit 38 of the tire condition monitoring system. Specifically, a vehicle-based antenna 32 that is operatively connected to a vehicle-based receiver 34 of the unit 38 receives the signal. Within the vehicle-based unit, an electronic controller (hereinafter referred to as an electronic control unit or ECU) 40 is operatively connected to the receiver 34 such that the conveyed tire condition information, the identification, etc. are provide to the ECU.

In one example, the ECU 40 comprises a plurality of discrete circuits, circuit components, and a controller. A person of ordinary skill in the art will appreciate that the ECU 40 can take several forms including a combination digital or analog circuits or packaged as an application specific integrated circuit (ASIC).

The ECU 40 is operatively connected to a wheel speed sensor 36. In one example, the wheel speed sensor 36 is part of an anti-lock braking system (ABS). In the example, the wheel speed sensor 36 is operatively connected to the wheel end housing 14.

The wheel speed sensor 36 outputs a signal indicative of the rotational speed of the associated wheel 16 and thus the tire 20. For example, the wheel speed indicative signal has a signal characteristic that varies in proportion to the rotational speed of the wheel 16. The wheel speed indicative signal is provided to the ECU 40.

It is to be appreciated that the ECU 40 receives a plurality of signals from plural speed sensors associated with the plural tires of the vehicle. Each wheel speed indicative signal thus corresponds to a particular tire location (e.g., right front, left front, right rear, and left rear). The connection of the wheel speed sensors to the ECU 40 is such that the ECU comprehends the tire location (e.g., right front) of each wheel speed indicative source.

The ECU 40 is operatively connected to an indication and control panel 42. The indication and control panel 42 includes portions that provide an indication of the sensed tire characteristics to a vehicle operator. The portions that provide the indication to the vehicle operator include visual (e.g., display screens or indicator lights) and/or audible (e.g., buzzers or chimes) indicator devices. Due to the fact that the signal transmitted from the transponder 22 contains an identification, the indication and control panel 42 provides an indication of the location of the tire 20 along with the sensed condition. For example, when the ECU 40 is apprised, via signal, that the front left tire has a low inflation pressure, the indication and control panel 42 indicates that the left front tire is the tire that has the low inflation pressure. Similarly, the sensed conditions at the other tires are indicated in a manner associated with tire location.

In order to indicate the sensed tire condition and the associated location of the tire together, the ECU contain a memory, or the like, that holds identifications that are used to match with the identifications provided via the transmitted signals. Each held identification is paired with a tire location in the memory. When an identification that provided via a received transmission is matched to an identification held in the memory, the ECU associates the tire condition information provided via that transmission with the tire location paired to that identification.

In order to keep the pairing of identifications and tire locations current, the arrangement 10 has means to modify the identifications and/or pairings to tire locations. In sum, the tire condition monitoring system is re-programmable. The indication and control panel 42 includes a portion that is actuatable by the operator, or other person such as a service technician, to cause the arrangement 10 enter a "reprogram" mode. Specifically, the "reprogram" mode is designed to adapt to changes in the tires and/or transponders (e.g., new tires installed on the vehicle for the first time or a tire that is changed a previous location). In one example, the actuation is a manual actuation of a pushbutton or the like on the indication and control panel 42. Upon actuation, a signal is sent from the indication and control panel 42 to the ECU 40. Also, the indication and control panel 42 may even provide an indication of the entry into the reprogram mode.

In order to be able to perform the "reprogram" feature, the vehicle tire(s) 20 must be permitted to individually spin. As shown in the example embodiment of FIG. 1, the vehicle is elevated from the from the traveling surface (e.g., the ground) 44 using a jack stand 46, lift, hoist or the like, such that the tire 20 is free to be rotated by hand.

The ECU 40 controls the indication and control panel 42 to provide a prompt to the person to spin any tire 20 that has had some change (e.g., replacement of a transponder or new to a certain tire location) occur that merits identification of the tire within the arrangement 10. The tire is manually or otherwise rotated, while the other tires are stationary.

As the tire 20 is spun, the wheel speed sensor 36 associated with the tire being spun provides a signal to the ECU 40 that identifies the position. Further, during the tire spin, the centrifugal switch 28 associated with the tire 20 being spun closes such that the transponder 22 transmits the signal with the tire identification to the ECU 40. Thus, the ECU 40 receives two signals, one from the wheel speed sensor 36 identifying the tire position and another from the transponder 22 providing an identification for the tire 20 being spun. The ECU 40 processes, associates, and stores the information (i.e., identification and location). In one embodiment, the ECU 40 communicates with the indication and control panel 42 to provide an indication that the tire identification and location have been received and stored, and to prompt the person to either proceed with spinning of another tire or to end the "reprogram" mode.

Normally, only the tires that have experience a change (e.g., replaced or rotated) need to be involved with the reprogramming. When the ECU 40 is in the "reprogram" mode, the ECU 40 does not erase all of the tire identification(s) for those tire(s) that were previously identified. In the "reprogram" mode, the ECU 40 only overwrites the previously stored information for each tire location that has a new/updated tire identification and leaves undisturbed the stored information for any tire location that has not had a new/updated tire.

Figure 2:
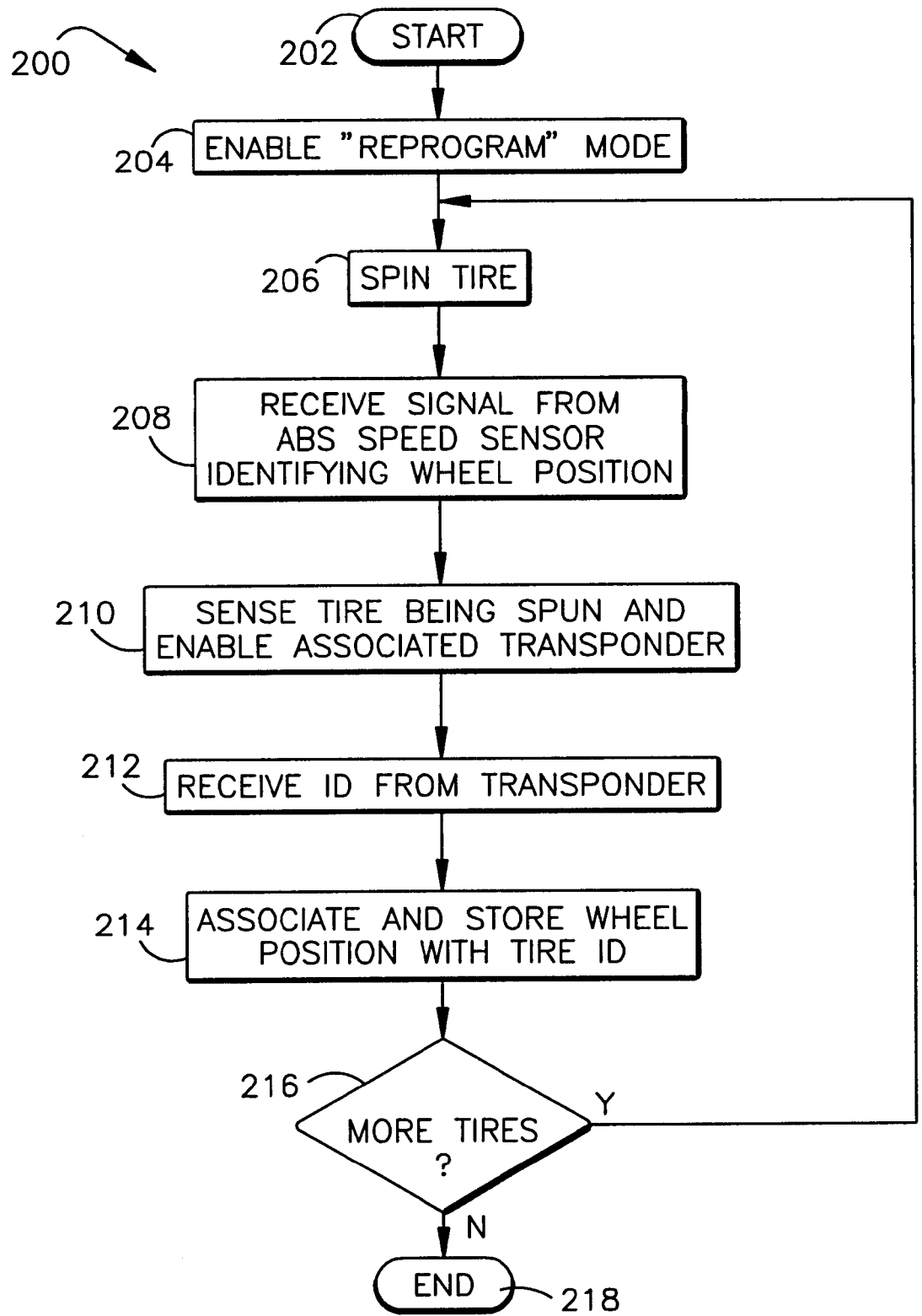
FIG. 2 is a flowchart diagram of a process associated with the embodiment shown in FIG. 1.

Referring to FIG. 2, a process 200 associated with the example of FIG. 1 is shown. Specifically, the process 200 is used in conjunction with the vehicle that includes wheel speed sensors, such as those provided within an ABS system. The process 200 begins at step 202 where memories are cleared, initial flag conditions are set, etc., as will be appreciated by the skilled artisan. The process 200 then proceeds to step 204 where the person enables the "reprogram" mode. From step 204, the process proceeds to step 206.

At step 206, the ECU 40 prompts the person via the indication and control panel 42 to spin a tire 20 and the person spins the tire. Of course, it is to be appreciated that prompt may be by any other means. For example, the prompt may be via vehicle horn honk, lamp flash, etc. At step 208, while the tire 20 is spinning, the wheel speed sensor 36 senses the tire 20 spinning and sends a signal to the ECU 40 indicative of the tire location (e.g., right front) associated with the tire 20 being spun. From step 208, the process proceeds to step 210.

At step 210, the centrifugal switch 28, which is operatively connected to the transponder 22 associated with the tire 20 being spun, senses the tire 20 spinning. As a result, the centrifugal switch 28 enables the transponder 22 to transmit the signal identifying the tire 20 being spun and a signal indicative of the sensed tire condition. From step 210, the process proceeds to step 212. At step 212, the ECU 40 receives the tire identification signal from the transponder 22 associated with the tire 20 being spun.

At step 214, the ECU 40 processes, associates, and stores the tire identification signal received from the transponder 22 with the tire location. Further, the ECU 40, via the indication and control panel 42, indicates that the tire 20 has been identified. From step 214, the process proceeds to step 216.

At step 216, a determination is made as to whether there are more tires that need to be identified. If the determination is affirmative, the process 200 then loops back to step 206. At step 206 the person is prompted to spin another tire and the other tire is spun. If the determination in step 216 is negative, the process proceeds to step 218 where the operator ends the "reprogram" mode.

A situation could occur, if the vehicle is mounted on a hoist, that the other tires spin while the operator is spinning the tire 20 that needs to be identified. However, because the other tires are not being driven to spin but are freely spinning, the tire 20 being spun by the operator would spin faster than the other tires. Thus, the ECU 40' would compare the rotational speeds from all the wheel speed sensors associated with each tire and consider the one with the greater speed signal.

Figure 3:
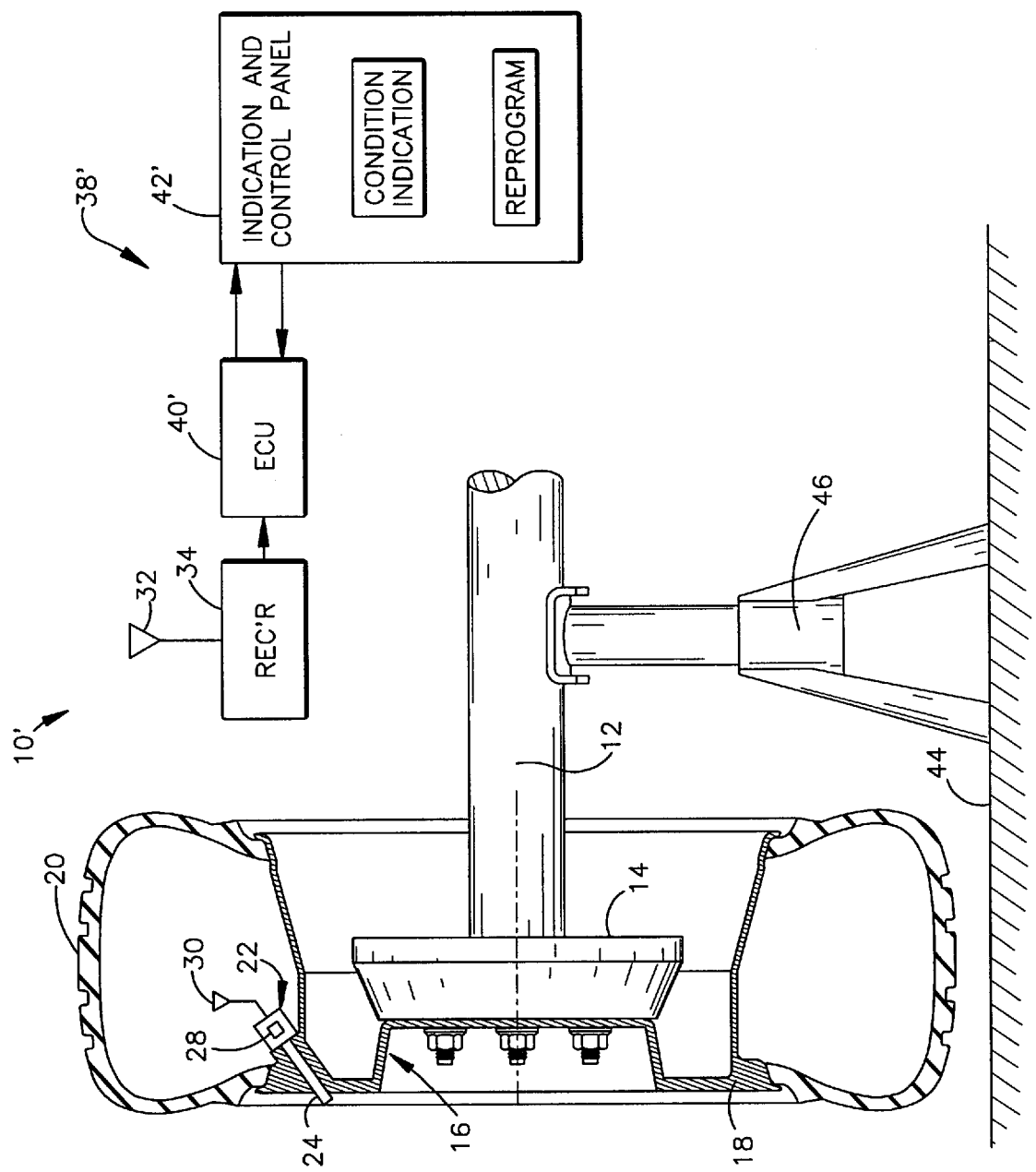
FIG. 3 is a schematic illustration of a second embodiment of a vehicle tire identification arrangement, in accordance with the present invention, along with related vehicle structure and vehicle servicing components.

FIG. 3 is another embodiment that is for a vehicle that does not include wheel speed sensors. For example, the embodiment of FIG. 3 is for a vehicle that does not include an ABS system. Structure of the embodiment of FIG. 3 that is identical to corresponding structure of the embodiment of FIG. 1 is identified with identical reference numerals. Structure of the embodiment of FIG. 3 that is similar to corresponding structure of the embodiment of FIG. 1 is identified with the same reference numerals with prime markers.

In operation, the ECU 40' communicates with the indication and control panel 42' to provide a prompt to the person to spin a tire 20 at a particular location. In other words, the ECU can select the tire location and accordingly prompts the person to spin that tire. In this manner, the ECU 40' anticipates that a subsequently received identification signal corresponds to the selected tire location.

For example, the person is prompted to spin the tire 20 at a first tire location (e.g., right front). If the tire 20 associated with the particular location is not in need of updating of identification information, the operator can input a request to skip the first tire location and proceed to the next tire location (e.g., left front). These steps repeated as needed.

For a tire that is spun, the centrifugal switch 28 enables the transponder 22 to send a tire pressure signal and a tire identification signal to the ECU 40'. The ECU 40' processes, associates, and stores the received tire location for that tire location.

Figure 4:
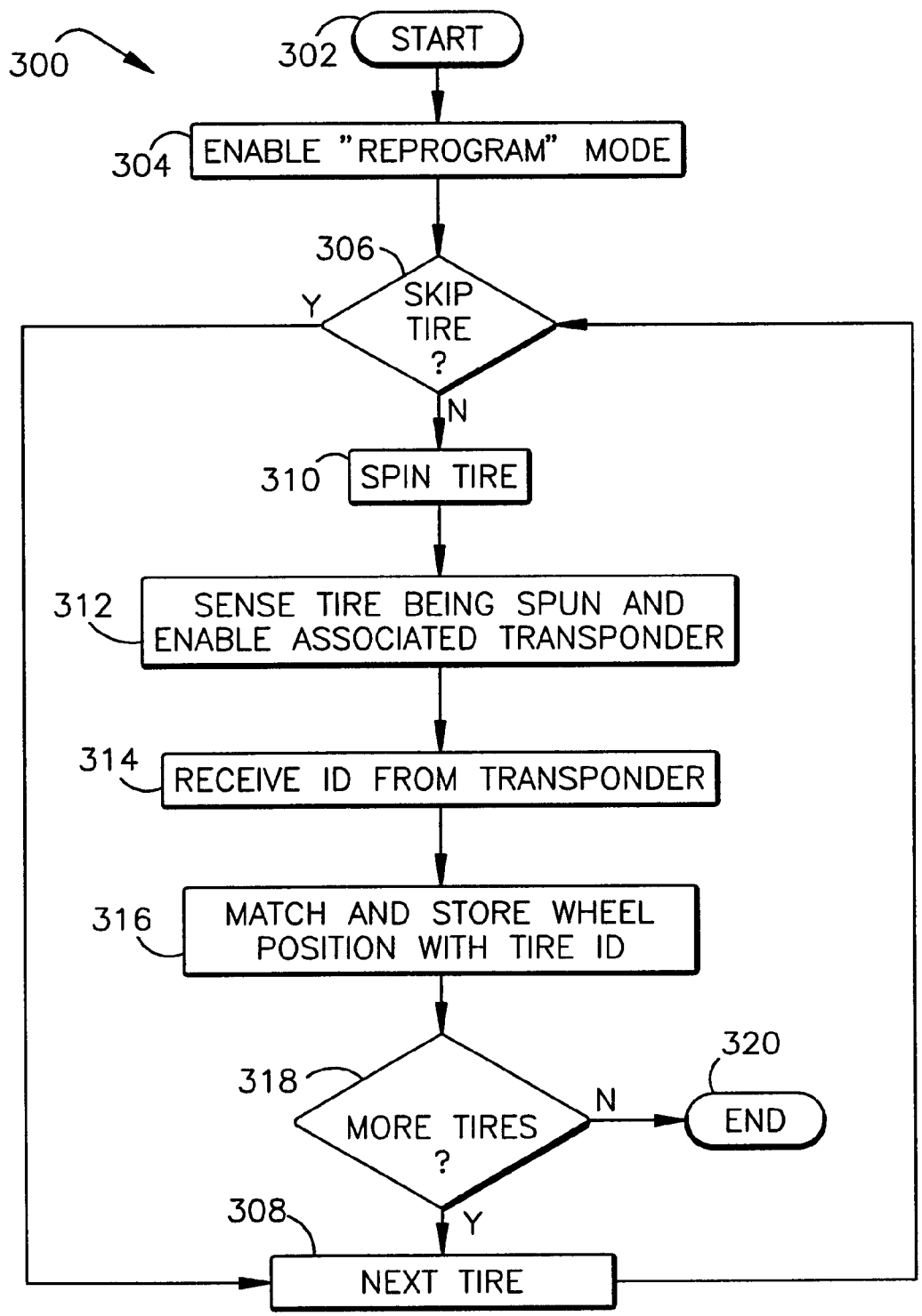
FIG. 4 is a flowchart diagram of a process associated with the embodiment shown in FIG. 3.

FIG. 4 shows an example process 300 associated with the embodiment of FIG. 3. Specifically, the process 300 is for a vehicle that does not include wheel speed sensors (e.g., no ABS system). The process 300 is initiated at step 302 and proceeds to step 304 where the person enables the "reprogram" mode via the indication and control panel 42'. Also, The person is prompted to spin a selected tire.

At step 306, it is queried if the tire location is to be skipped. For example, in the event the particular tire on the right front tire was not changed or replaced, that particular tire can be skipped. If the determination at step 306 is affirmative (i.e., skip the current tire location), the process 300 proceeds to step 308 and the ECU 40' would proceed with the next tire mounted on the next tire position. A prompt is provided to the person. From step 308, the process 300 loops back to step 306 to again query if the current tire location is to be skipped.

If the determination at step 306 is negative (i.e., do not skip the current tire location), the process proceeds to step 310. At step 310, the person spins the tire at the location selected and prompted. At step 312, the centrifugal switch 28 at the spinning tire enables the transponder 22 to transmit a signal that conveys the identification and the sensed condition information.

At step 314, the ECU 40' receives the tire identification signal from the transponder 22 associated with the tire 20 being spun. At step 316, the ECU 40' processes, associates, and stores the tire identification signal received from the transponder 22 with the selected tire position. Further, an indication of completion for the tire location is provided via the indication and control panel 42'. From step 316, the process proceeds to step 318.

At step 318, a determination is made as to whether there are more tires that need to be identified. If the determination is affirmative, the process proceeds to step 308 and the ECU 40' would proceed with the next tire mounted on the next tire position (e.g., left front). The process then loops back to step 306. If the determination in step 318 is negative, the process proceeds to step 320 where the process ends the "reprogram" mode.

A person of ordinary skill in the art will appreciate that, in the event the vehicle is mounted on a hoist, the operator could run the "reprogram" mode from a remote terminal such as a computer or hand-held computer including an infrared port. The ECU 40' would include an infrared port to transmit to the remote terminal a signal indicative of the tire 20 being identified. Of course, it is to be appreciated that other alternatives to the use of infrared transmission are possible. For example, a wired connection to the ECU, or a wired connection to an in-vehicle network bus could be used.

In accordance with one embodiment of the present invention, if it were necessary to "teach" the system a new tire location, the operator would press a button on the indication and control panel 42' to begin the "reprogram" mode of operation. A person of ordinary skill in the art will appreciate that, in the alternative, the "reprogram" mode button could be concealed and accessible only by a service operator qualified to run such program. Still further, it is to be appreciated that the reprogram mode may be initiated by some other means. For example, the reprogram mode may be initiated via an in-vehicle network diagnostic tool.

From the above description of the invention, those skilled in the art will perceive improvements, changes and modifications. Such improvements, changes and modifications within the skill of the art are intended to be covered by the appended claims.

Having described the invention, the following is claimed:

1. An arrangement for matching vehicle tires with tire locations on a vehicle, the arrangement comprising:
   a plurality of rotation sensors, each tire location having an associated rotation sensor that senses rotation of a tire located at the tire location and provides a rotation signal indicative of the sensed rotation;
   a plurality of transponders, each tire having an associated transponder that provides a transponder signal having a unique identification code in response to rotation of the tire; and
   a vehicle-based controller for, when one of the vehicle tires is rotated, receiving the rotation signal from the associated rotation sensor and for receiving the transponder signal from the associated transponder in response to the tire rotation, the vehicle-based controller matching the identification code from the received transponder signal to the tire location having the associated rotation sensor providing the rotation signal.

2. The arrangement of claim 1 wherein each of the plurality of transponders includes an associated centrifugal switch for actuating the transponder to provide the transponder signal in response to rotation of the tire.

3. The arrangement of claim 1 wherein each of the plurality of rotation sensors is a vehicle braking system wheel speed sensor.

4. The arrangement of claim 1 further including an indication and control panel that is operatively connected to the vehicle-based controller, the indication and control panel having an actuatable portion for causing the vehicle-based controller to enter a reprogram mode in which at least one new identification code is to be matched to a tire location on the vehicle.

5. The arrangement of claim 4 wherein the vehicle-based controller includes a memory, newly stored information in the memory overwriting previously stored information in the memory.

6. The arrangement of claim 4 wherein the indication and control panel provides a prompt for prompting to a person to rotate a tire for which matching of the identification code and the tire location is desired.

7. The arrangement of claim 1 wherein the vehicle-based controller includes an antenna for receiving radio signals and wherein each transponder signal is a radio signal.

8. The arrangement of claim 7 wherein, in addition to including the unique identification code, the radio signal provided by each of the plurality of transponders also includes tire condition information.

9. The arrangement of claim 8 wherein the tire condition information includes tire inflation pressure information.

10. An arrangement for matching a vehicle tire with a location on a vehicle, the arrangement comprising:
    means for sensing rotation of the tire and for providing a rotation signal indicative of the sensed rotation, the means for sensing rotation having a known location on the vehicle;
    means for providing a transponder signal having a unique identification code in response to rotation of the tire; and
    means for receiving the rotation signal and the transponder signal and for matching the identification code from the received transponder signal to the known location from which the rotation signal was provided.

11. The arrangement of claim 10 wherein the means for providing a transponder signal includes means for actuating transmission of the transponder signal in response to rotation of the tire.

12. The arrangement of claim 10 wherein the means for sensing rotation of the tire is a vehicle braking system wheel speed sensor.

13. The arrangement of claim 10 further including means for entering a reprogram mode in which at least one new identification code is to be matched to a tire location on the vehicle.

14. The arrangement of claim 13 further including means for prompting a person to rotate the tire for which matching of the identification code and the tire location is desired.

15. A method for matching vehicle tires with tire locations on a vehicle, the method comprising the steps of:
    sensing rotation of a tire located at a tire location on the vehicle;
    providing a rotation signal indicative of the sensed rotation;
    providing a transponder signal having a unique identification code in response to rotation of the tire;
    receiving the rotation signal and the transponder signal; and
    matching the identification code from the transponder signal to the tire location from which the rotation signal was provided.

16. The method of claim 15 wherein the step of providing the transponder signal further includes the steps of sensing centrifugal force associated with rotation of the tire and providing the transponder signal in response to the sensed centrifugal force.

17. The method of claim 15 wherein the step of matching the identification code from the transponder signal to the tire location from which the rotation signal was provided further includes the steps of monitoring for actuation of a switch and entering a reprogram mode in response to actuation of the switch.

18. The method of claim 15 further including the step of storing in a memory a matched identification code for each tire location.

19. The method of claim 18 further including the step of overwriting previously stored information in the memory with new information indicative of a matched identification code and tire location in response to a reprogram request.

20. The method of claim 15 further including the step of prompting a person to rotate the tire for which matching of the identification code and the tire location is desired.

* * * * *